(12) United States Patent
Carnevali

(10) Patent No.: US 9,776,577 B2
(45) Date of Patent: Oct. 3, 2017

(54) MODULAR ELECTRONICS PLATFORM

(76) Inventor: Jeffrey D. Carnevali, Seattle, WA (US)

( * ) Notice: Subject to any disclaimer, the term of this patent is extended or adjusted under 35 U.S.C. 154(b) by 0 days.

(21) Appl. No.: 13/584,578

(22) Filed: Aug. 13, 2012

(65) Prior Publication Data

US 2014/0042285 A1 Feb. 13, 2014

(51) Int. Cl.
| | | |
|---|---|---|
| *F16B 2/12* | (2006.01) | |
| *B60R 11/02* | (2006.01) | |
| *F16M 13/00* | (2006.01) | |
| *F16M 11/04* | (2006.01) | |
| *B60R 11/00* | (2006.01) | |

(52) U.S. Cl.
CPC .......... *B60R 11/02* (2013.01); *F16M 11/041* (2013.01); *F16M 13/00* (2013.01); *B60R 2011/008* (2013.01); *B60R 2011/0071* (2013.01); *B60R 2011/0078* (2013.01); *B60R 2011/0288* (2013.01); *F16B 2/12* (2013.01); *F16M 2200/02* (2013.01)

(58) Field of Classification Search
USPC ..... 248/228.3, 231.41, 316.4, 316.6, 346.03, 248/346.01, 346.06, 346.07, 346.5; 269/43, 45, 246; 108/43, 137
See application file for complete search history.

(56) References Cited

U.S. PATENT DOCUMENTS

| | | | |
|---|---|---|---|
| 4,056,696 A | 11/1977 | Meyerle | |
| 4,489,928 A * | 12/1984 | Dietrich | ........................ 269/251 |
| 5,282,246 A | 1/1994 | Yang | |
| 5,907,796 A | 5/1999 | Matchett et al. | |
| 6,049,725 A | 4/2000 | Emmert et al. | |
| 6,370,741 B1 | 4/2002 | Lu | |
| 6,427,959 B1 | 8/2002 | Kalis et al. | |
| 6,585,212 B2 * | 7/2003 | Carnevali | ................ 248/346.07 |
| 6,600,827 B2 * | 7/2003 | Lu | .................. 381/388 |
| 6,603,959 B1 | 8/2003 | Peiker | |
| 6,775,561 B1 | 8/2004 | Peiker | |
| 6,785,567 B2 | 8/2004 | Kato | |
| 6,817,587 B2 * | 11/2004 | Lin | ........................ 248/346.04 |
| 7,032,872 B2 * | 4/2006 | Sullivan | .................. 248/346.07 |
| 7,523,528 B2 * | 4/2009 | Carnevali | ........................ 24/523 |

(Continued)

OTHER PUBLICATIONS 2 pages: Applicant_Record_of_Interview_U.S. Appl. No. 13/584,578.

*Primary Examiner* — Alfred Wujciak
(74) *Attorney, Agent, or Firm* — Charles J. Rupnick Attorney at Law

(57) ABSTRACT

A modular device mounting platform apparatus having interchangeable jaw members for accommodating different devices. The device mounting platform apparatus includes a frame member capable of being mounted, by example and without limitation, in a vehicle and having a device mounting surface facing generally upward. A telescoping clamp member is slidably interconnected to frame member along a first direction. A biasing mechanism is coupled between frame and clamp members for urging a jaw member of the clamp member along first direction away from the frame member. A plurality of different jaw members are interchangeably coupleable to the frame and clamp members in an opposing relationship across the device mounting surface of the frame.

19 Claims, 9 Drawing Sheets

(56) References Cited

U.S. PATENT DOCUMENTS

| | | | |
|---|---|---|---|
| 7,537,190 B2* | 5/2009 | Fan | 248/309.1 |
| 7,551,458 B2* | 6/2009 | Carnevali | 361/807 |
| 7,756,552 B2 | 7/2010 | Haikola et al. | |
| 7,756,556 B2 | 7/2010 | Patel et al. | |
| 7,823,844 B2* | 11/2010 | Carnevali | 248/176.1 |
| 8,074,951 B2 | 12/2011 | Carnevali | |
| 8,550,013 B2* | 10/2013 | Carnevali | 108/143 |
| 2005/0090301 A1 | 4/2005 | Lange et al. | |
| 2006/0278788 A1* | 12/2006 | Fan | 248/309.1 |
| 2007/0262223 A1* | 11/2007 | Wang et al. | 248/346.07 |
| 2011/0062299 A1* | 3/2011 | Tsai | 248/231.41 |

\* cited by examiner

MODULAR ELECTRONICS PLATFORM

FIELD OF INVENTION

The present invention relates generally to mounting platforms for holding portable devices, and in particular to modular mounting platforms for holding portable electronic devices, including lap top computers and other similarly sized electronics devices such as notebooks, tablets, pen tablets, scanners, hand-held electronic devices, etc.

BACKGROUND OF INVENTION

Many portable electronic devices, including by example and without limitation, laptop computers and other similar electronics devices such as notebooks, tablets, pen tablets, scanners, hand-held electronic devices, etc., require specially designed mounting platforms that can accommodate variations in shape and size among such devices. The mounting platforms of the prior art are generally able to accommodate only a single type of device, or even just one single device model. Accordingly, a new mounting platform must be purchased for mounting each new device, or to change between devices.

SUMMARY OF INVENTION

The present invention is a modular mounting platform apparatus having a plurality of interchangeable jaw members for accommodating different devices. The novel apparatus includes a core drive module having a frame member capable of being mounted, such as in a vehicle or other location, and having a device mounting surface capable of receiving different portable electronic devices, including by example and without limitation, laptop computers and other similarly sized electronics devices such as notebooks, tablets, pen tablets, scanners, hand-held electronic devices, etc. A clamp member is slidably interconnected to the frame member, and a biasing mechanism is coupled between the frame and clamp members for urging the jaw member of the clamp member away from the frame member. The biasing mechanism thus urges the clamp member into an open configuration. Each of the plurality of jaw members is interchangeably attachable to either the frame member or the clamp member of the core drive module for accommodating a wide variety of different devices.

Other aspects of invention are detailed herein.

BRIEF DESCRIPTION OF DRAWINGS

The foregoing aspects and many of attendant advantages of this invention will become more readily appreciated as same becomes better understood by reference to the following detailed description, when taken in conjunction with the accompanying drawings, wherein:

FIGS. 8 and 9 are detailed views of an interior of the core drive module of the novel apparatus of FIG. 1, wherein FIG. 8 illustrates the clamp member being configured in an expanded relationship relative to the frame member, and FIG. 9 illustrates the clamp member being configured in the contracted relationship relative to the frame member.

DETAILED DESCRIPTION OF PREFERRED EMBODIMENT

In Figures, like numerals indicate like elements.

Figure 1:
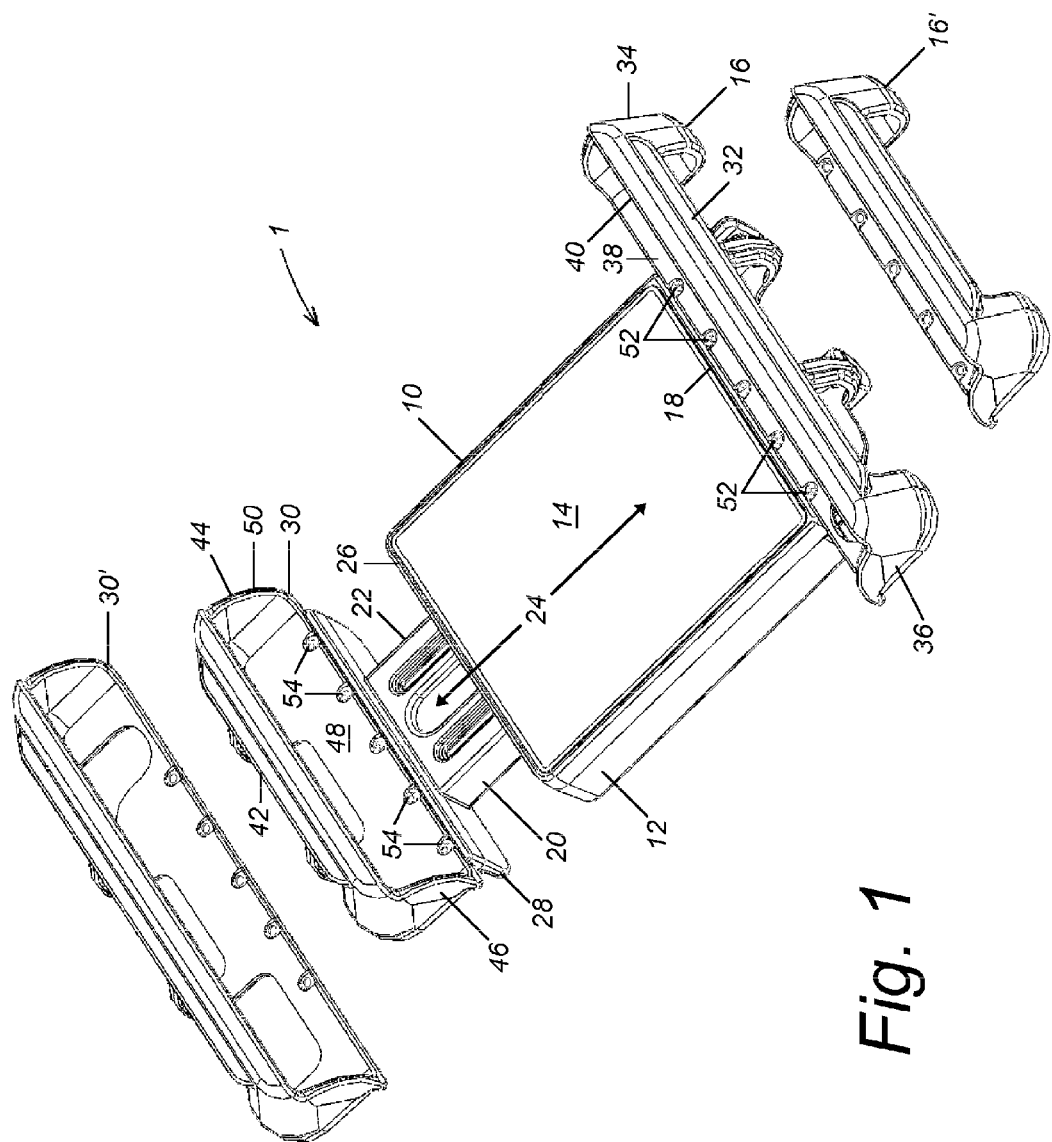
FIG. 1 is a top perspective view showing one example of a novel modular device mounting platform apparatus having a clamp member configured in a contracted relationship relative to a stationary frame member, and a plurality of detachable jaw members.

FIG. 1 illustrates invention by example and without limitation as a modular electronics mounting platform apparatus 1 includes a core drive module 10 having a base frame member 12 capable of being mounted in a vehicle and having a substantially rigid mounting plate 13 formed with a substantially planar device mounting surface/tray 14 facing generally upward for receiving an electronics device thereon. A detachable jaw member 16 is stationary adjacent to one edge 18 adjacent to mounting surface 14. A clamp member 20 of core drive module 10 is formed with a sled portion 22 slidably interconnected to frame member 12 generally along a substantially linear direction or path (indicated by arrow 24) for contracting and extending clamp member 20 relative to a second edge 26 of mounting surface 14 opposite from first edge 18. Sled portion 22 of clamp member 20 includes an end cap 28 distal from frame member 12 for detachably mounting a movable jaw member 30 oriented substantially transverse of direction 24.

In a contracted relationship (shown here) of clamp member 20 relative to frame member 12, movable jaw member 30 thereof is contracted along direction 24 into a position adjacent to second edge 26 of mounting surface 14.

In an expanded relationship (disclosed herein) of clamp member 20 relative to frame member 12, movable jaw member 30 thereof is extended along direction 24 into a position spaced away from second edge 26 of mounting surface 14.

As illustrated here by example and without limitation, stationary jaw member 16 of frame member 12 is formed with a cup portion 32 extended adjacent to first edge 18 for operating as a stop for an electronics device on mounting surface 14. Jaw member 16 is optionally formed with opposing wrapped around end portions 34 and 36, e.g., for centering the electronics device on mounting surface 14. A lower lip portion 38 and an overhanging lip portion 40 opposite thereof are structured for retaining the electronics device therebetween in a position on mounting surface 14 of frame member 12.

Jaw member 30 of clamp member 20 is illustrated here by example and without limitation as having a cup portion 42 adjacent to end cap 28 of sled portion 22 extended substantially transverse thereof and of direction 24. Jaw member 30 is optionally formed with opposing wrapped around end portions 44 and 46, e.g., for centering the electronics device on mounting surface 14. A lower lip portion 48 and an overhanging lip portion 50 opposite thereof are structured for retaining the electronics device therebetween in a position adjacent to end cap 28 of clamp sled portion 22 distal from mounting surface 14 of frame member 12.

A portable electronics device is mounted in novel modular electronics platform apparatus 1 while clamp member 20 is extended (FIG. 2) by fitting between opposing wraparound end portions 34 and 36 of cup portion 32, and positioning against frame's stationary jaw member 16 under overhanging lip portion 40. The portable electronics device is settled against generally upward facing device mounting surface 14. Clamp member 20 is contracted for moving jaw member 30 thereof against the portable electronics device opposite of stationary jaw member 16. The portable electronics device is positioned over lower lip portion 48 between wraparound end portions 44 and 46. Cup portion 42 of movable jaw 30 is positioned against the portable electronics device opposite from cup portion 42 of stationary jaw member 16, with lip portion 50 overhanging the portable electronics device. The portable electronics device is thus effectively secured within confines of novel modular electronics platform apparatus 1 in a manner which exposes its top surface to user.

Stationary jaw member 16 is detachable from forward edge 18 of frame member 12, including its cup portion 32. This detachability of stationary jaw member 16 from frame member 12 permits exchange with differently configured stationary jaw members for receiving differently configured electronics devices. Additionally, movable jaw member 30 of clamp member 20 is detachable from sled portion 22 for exchange with differently configured movable jaw members. Accordingly, novel modular electronics platform apparatus 1 is capable of receiving differently configured electronics devices having a different width and/or a different length and/or a different thickness.

This interchangeability of either or both of stationary jaw member 16 and moveable jaw member 30 permits manufacturer to offer a variety of different configurations of modular electronics platform apparatus 1, while manufacturing and stocking a single basic frame member 12 and a variety of different stationary jaw members 16 and 16', and a variety of different moveable jaw members 30 and 30'. Although only two different stationary jaw members 16, 16' and two different moveable jaw members 30, 30' are shown, it will be understood that a large variety of different stationary jaw members 16, 16' and different moveable jaw members 30, 30' are contemplated for accommodating differently configured electronics devices having different sizes and shapes as well as different interface connection points which may be substituted without deviating from the scope and intent of the present invention. Furthermore, a consumer can also update modular electronics platform apparatus 1 purchased for a first model electronics device to receive a new or different electronics device by substituting different stationary jaw members 16' and/or different moveable jaw members 30' for an original stationary jaw member 16 and/or moveable jaw member 30.

As disclosed here by example and without limitation, an attachment mechanism 52, such as a first plurality of threaded or other fasteners or other suitable decoupleable attachment mechanism, couples stationary jaw member 16 to frame member 12. Another attachment mechanism 54, such as a second plurality of threaded or other fasteners or other suitable decoupleable attachment mechanism, couples movable jaw members 30 to end cap 28 of sled portion 22 of clamp member 20. Stationary jaw member 16 is decoupled from frame member 12 by decoupling of attachment mechanism 52, and a different stationary jaw member 16' is coupled to frame member 12 by recoupling attachment mechanism 52. Similarly, moveable jaw member 30 is decoupled from sled portion 22 of clamp member 20 by decoupling of attachment mechanism 54, and a different moveable jaw member 30 is coupled thereto by recoupling attachment mechanism 54.

As disclosed here by example and without limitation, different stationary jaw members 16 and 16', and different moveable jaw members 30 and 30' are provided with suitable apertures for accommodating attachment mechanisms 52 and 54.

Figure 2:
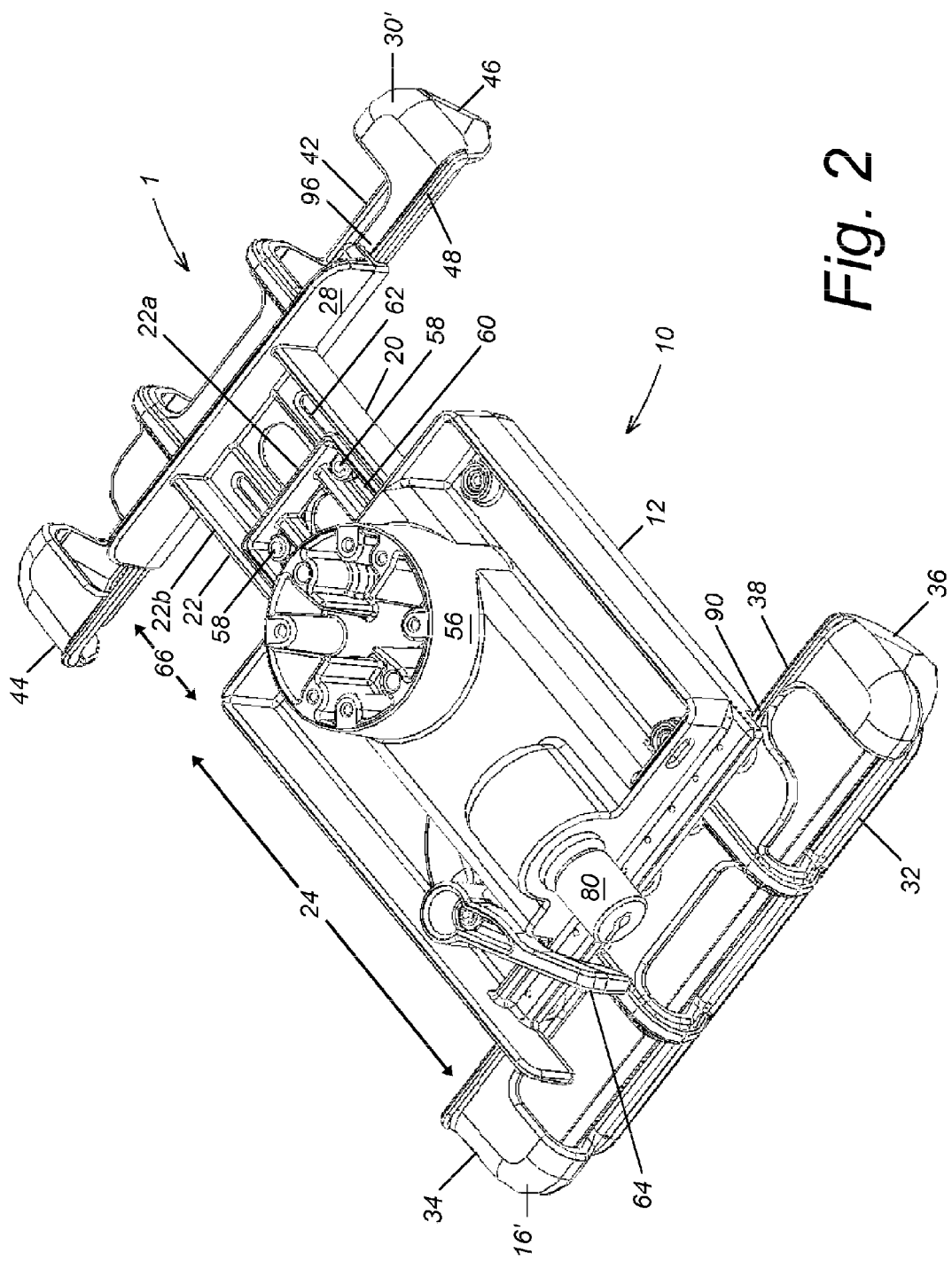
FIG. 2 is another bottom perspective view that illustrates the novel apparatus of FIG. 1 by example and without limitation as a having the clamp member configured in the contracted relationship relative to the frame member.

FIG. 2 is a bottom view of novel modular electronics platform apparatus 1 showing a frame member 12 of core drive module 10 being formed with a mounting structure 56 for mounting modular electronics platform apparatus 1 in a vehicle with device mounting surface 14 having a generally upwardly orientation. Here, slidable sled portion 22 is optionally configured as a telescoping sled portion having base portion 22a that is slidably interconnected to frame member 12 of core drive module 10, and an adjustment portion 22b. Adjustment portion 22b is fixable to base portion 22a at any position anywhere along its length. For example, one or more threaded fasteners or other releasable attachment mechanism 58 between matching slots 60 and 62 of base portion 22a and adjustment portion 22b releasably fixes adjustment portion 22b to base portion 22a.

Core drive module 10 is shown here as including a contractor drive 64 configured as a substantially rigid handle coupled for contracting clamp member 20 relative to frame member 12, whereby movable jaw member 30 of clamp member 20 is contracted to a position spaced a first lesser distance 66 from stationary jaw member 16 of frame member 12. Accordingly, when contractor drive 64 is operated for contracting clamp member 20 relative to frame member 12, the inserted electronics device is compressed between stationary and movable jaw members 16 and 30 and cannot be removed from electronics platform apparatus 1 due to obstruction of overhanging lip portions 40 and 50. Core drive module 10 is also shown here as including a lock mechanism for securing clamp member 20 in the contracted relationship relative to frame member 12 for securing the inserted electronics device in electronics platform apparatus 1.

Figure 3:
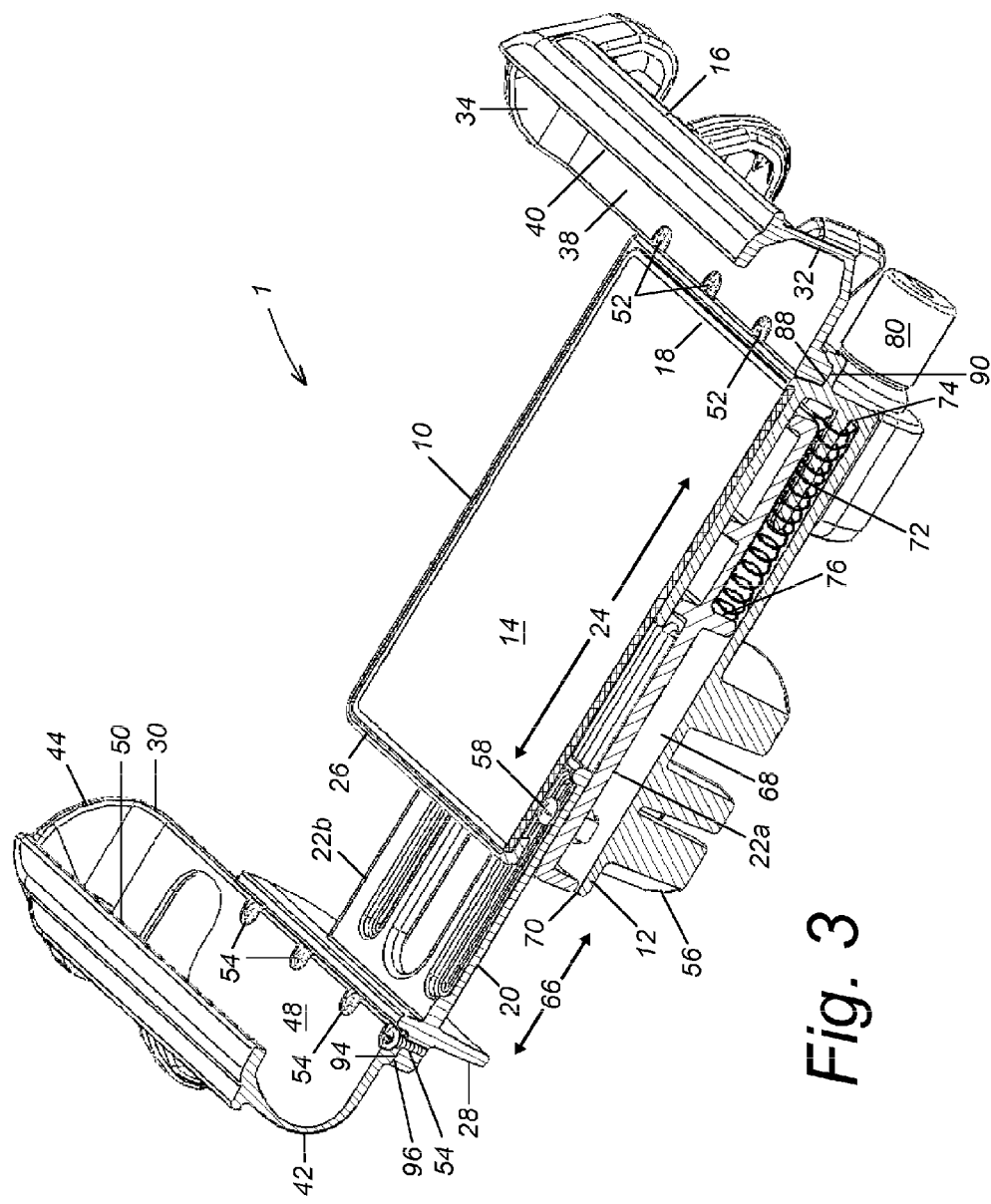
FIG. 3 is a cross-section view of the novel apparatus of FIG. 1 showing a sled portion of the clamp being slidable along a track within the frame member.

FIG. 3 is a cross-section view of novel modular electronics platform apparatus 1 showing sled portion 22 being slidable along direction 24 along a track 68 within frame member 12. Track 68 is formed as a channel in frame member 12 below device mounting surface 14, and operates as a guide for directing base portion 22a of sled 22 outwardly of a mouth opening 70 in frame member 12 adjacent to second edge 26 of mounting surface 14. Sled portion 22 of clamp member 20 is thereby slidably interconnected to frame member 12 for motion along direction 24 relative to second edge 26 of device mounting surface 14 and oriented substantially transverse of first and second edges 18, 26.

Core drive module 10 includes a biasing member 72 for expanding sled portion 22 relative to frame member 12. Here, biasing member 72 of core drive module 10 is shown by example and without limitation as a spring compressed between sled portion 22 of clamp member 20 and frame member 12. For example, biasing member 72 is arranged along track 68 in a position between an actuator portion 74 of frame member 12 and a reaction portion 76 of base sled portion 22a of clamp member 20 for urging base sled portion 22a to slide along first direction 24 within track channel 68 and heading out of mouth opening 70.

Figure 4:
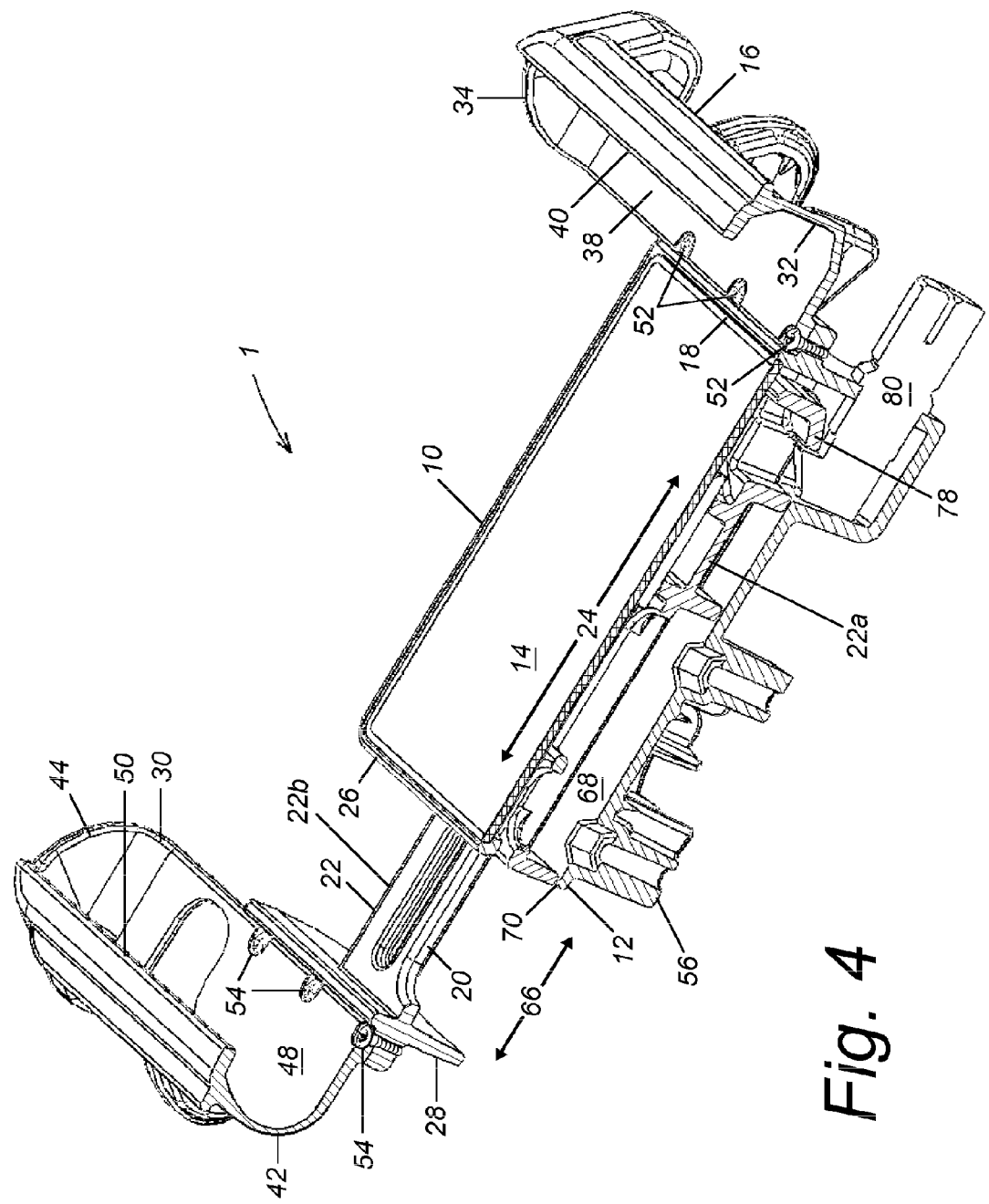
FIG. 4 is another cross-section view of the novel apparatus of FIG. 1 showing the sled portion of the clamp being slidable along a track within the frame member.

FIG. 4 is another cross-section view of novel modular electronics platform apparatus 1, wherein core drive module 10 is configured with sled portion 22 of clamp member 20 being contracted along first direction 24 into a contracted position adjacent to second edge 26 of device mounting surface 14. Frame and clamp members 12, 20 are illustrated here as being interlockable with clamp member 20 being contracted relative to frame member 12. By example and without limitation, sled 22 of clamp member 20 includes a latching portion 78 that is engageable with a catch 80 coupled to frame member 12 of core drive module 10. Catch 80 is, for example, either a latch or lock, such as a keyed lock (shown). Clamp member 20 is thus securely retained in contracted relationship with frame member 12 for confining the electronics device relative to mounting surface 14.

Figure 5:
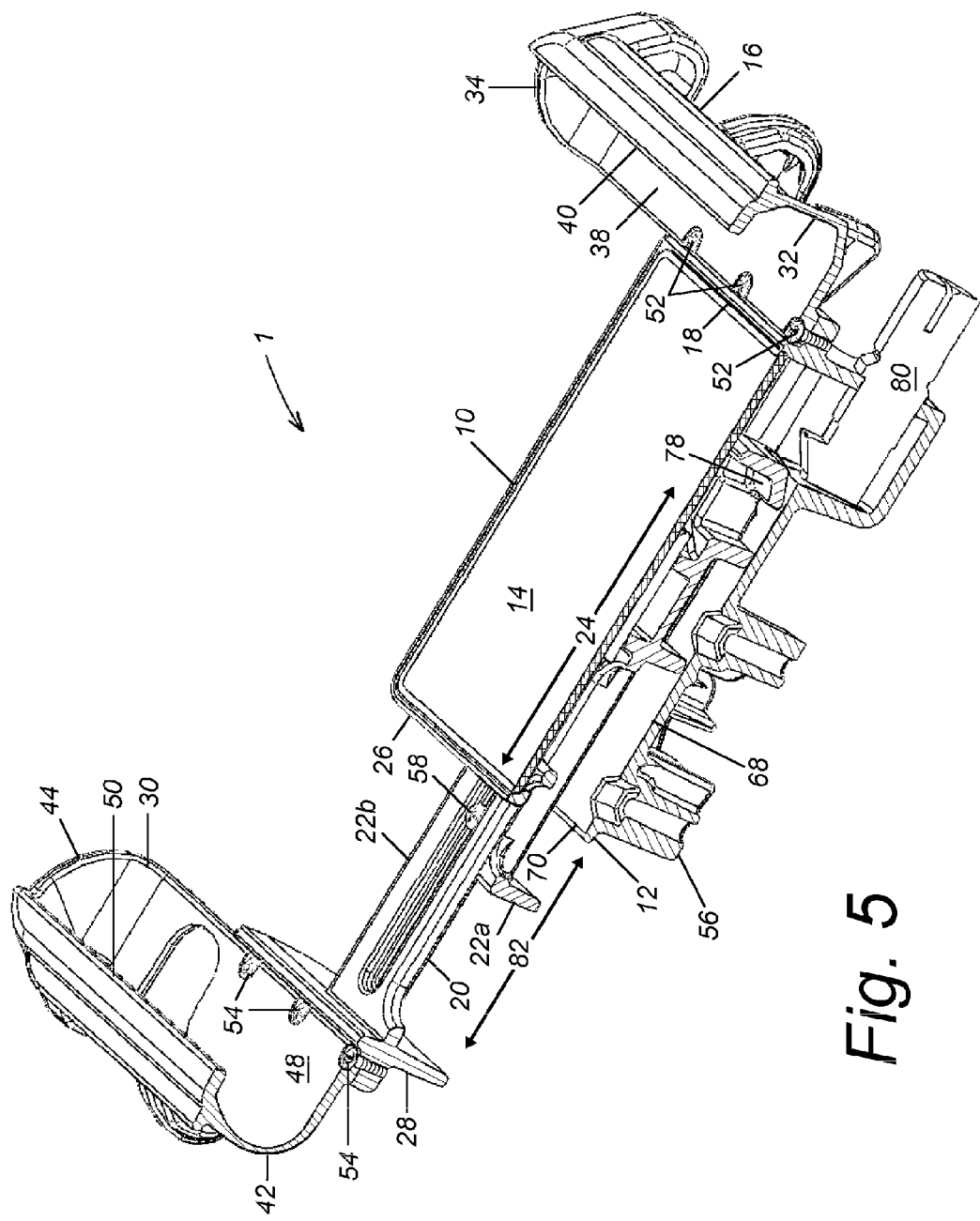
FIG. 5 is another cross-section view of is another cross-section view of the novel apparatus of FIG. 1 showing the sled portion of the clamp being slidable along a track within the frame member.

FIG. 5 is another cross-section view of novel modular electronics platform apparatus 1, wherein core drive module 10 is configured with sled portion 22 of clamp member 20 being expanded relative to frame member 12. Here, latching portion 78 is disengaged from catch 80, thereby releasing clamp member 20 from frame member 12.

Figure 6:
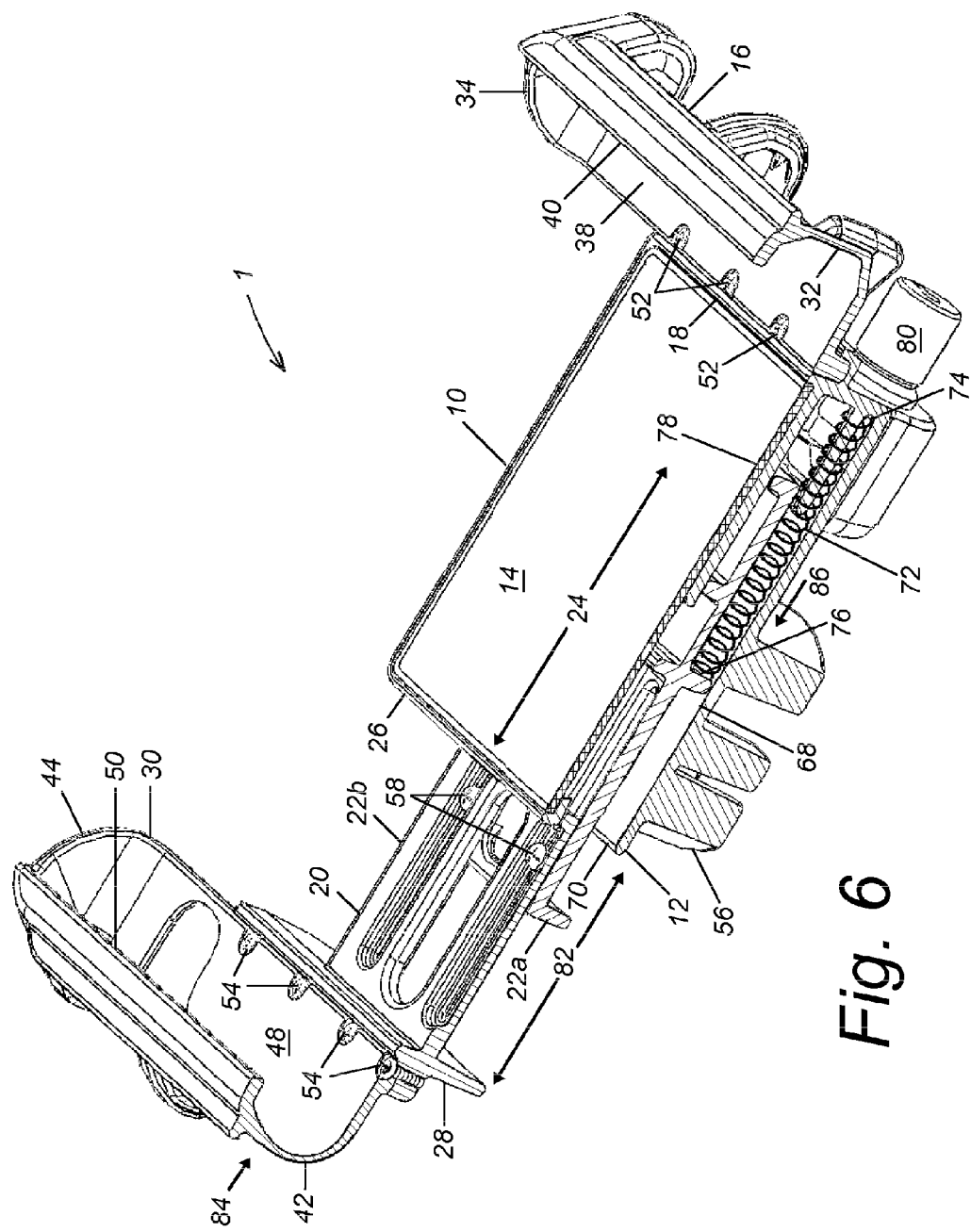
FIG. 6 is another cross-section view of the novel apparatus of FIG. 1 showing the sled portion of the clamp being slidable along a track within the frame member.

FIG. 6 is another cross-section view of novel modular electronics platform apparatus 1, wherein core drive module 10 is configured with sled portion 22 of clamp member 20 being expanded relative to frame member 12. Here, after latching portion 78 is disengaged from catch 80, biasing member 72 expands between clamp member 20 and frame member 12 of core drive module 10, whereby biasing member 72 urges sled portion 22 along track 68 of frame member 12. Accordingly, sled portion 22 of clamp member 20 is expansively extended along direction 24 outwardly through mouth opening 70 of frame member 12 adjacent to second edge 26 of mounting surface 14. Thereafter, movable jaw member 30 of clamp member 20 is spaced a second distance 82 from stationary jaw member 16 of frame member 12 greater than first lesser distance 66, whereby the electronics device can be inserted into or removed from electronics platform apparatus 1.

Clamp member 20 of core drive module 10 is forcefully contracted toward frame member 12 by application of an opposing external compressive force 84 greater than an internal expansive biasing force 86 exerted by biasing member 72 against reaction portion 76 of base sled portion 22a. The electronics device is thereby secured in electronics platform apparatus 1.

Figure 7:
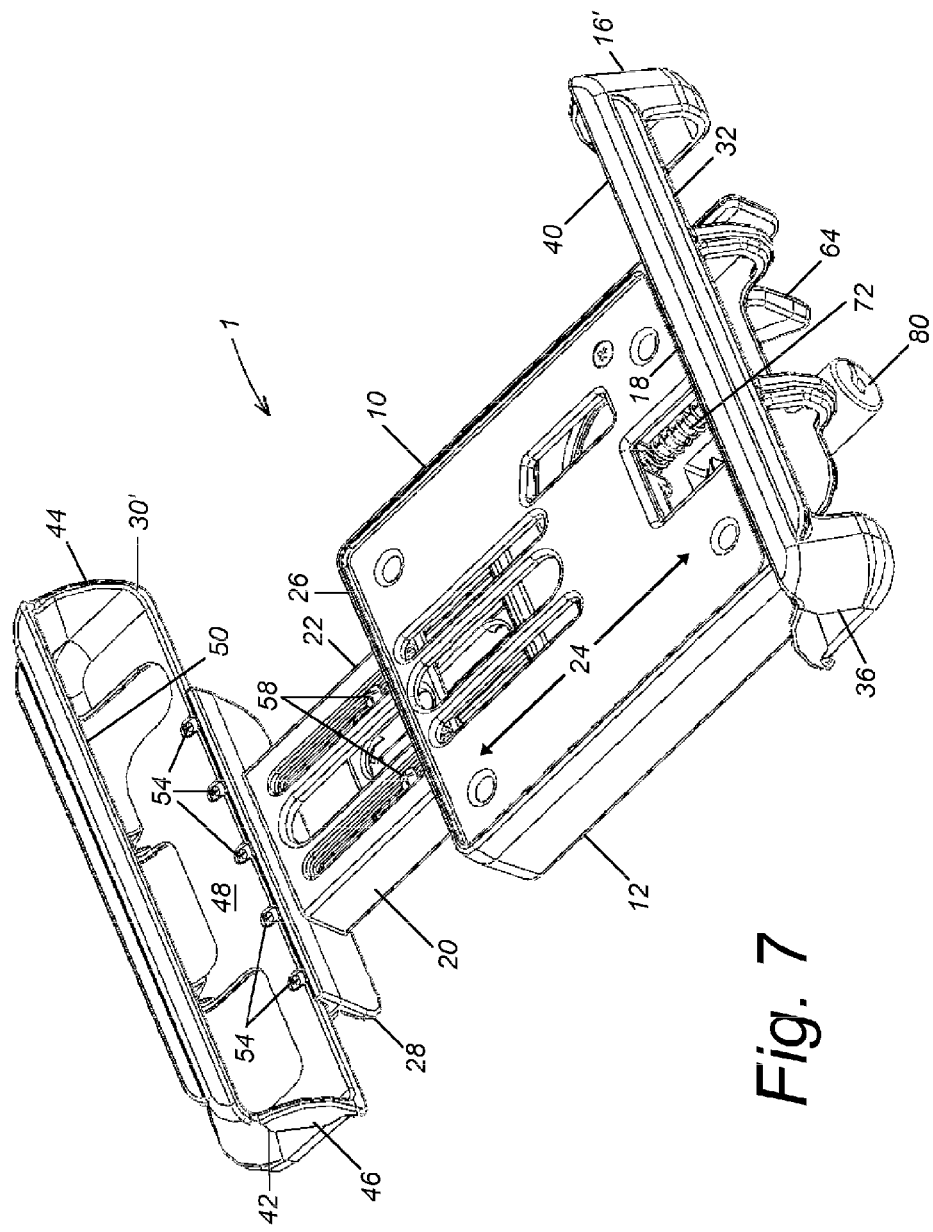
FIG. 7 is a top perspective view of the novel apparatus of FIG. 1, wherein a mounting plate of a core drive module is removed for clarity.

FIG. 7 is a top perspective view of novel modular electronics platform apparatus 1, wherein mounting plate 13 of core drive module 10 is removed for clarity.

Figure 8:
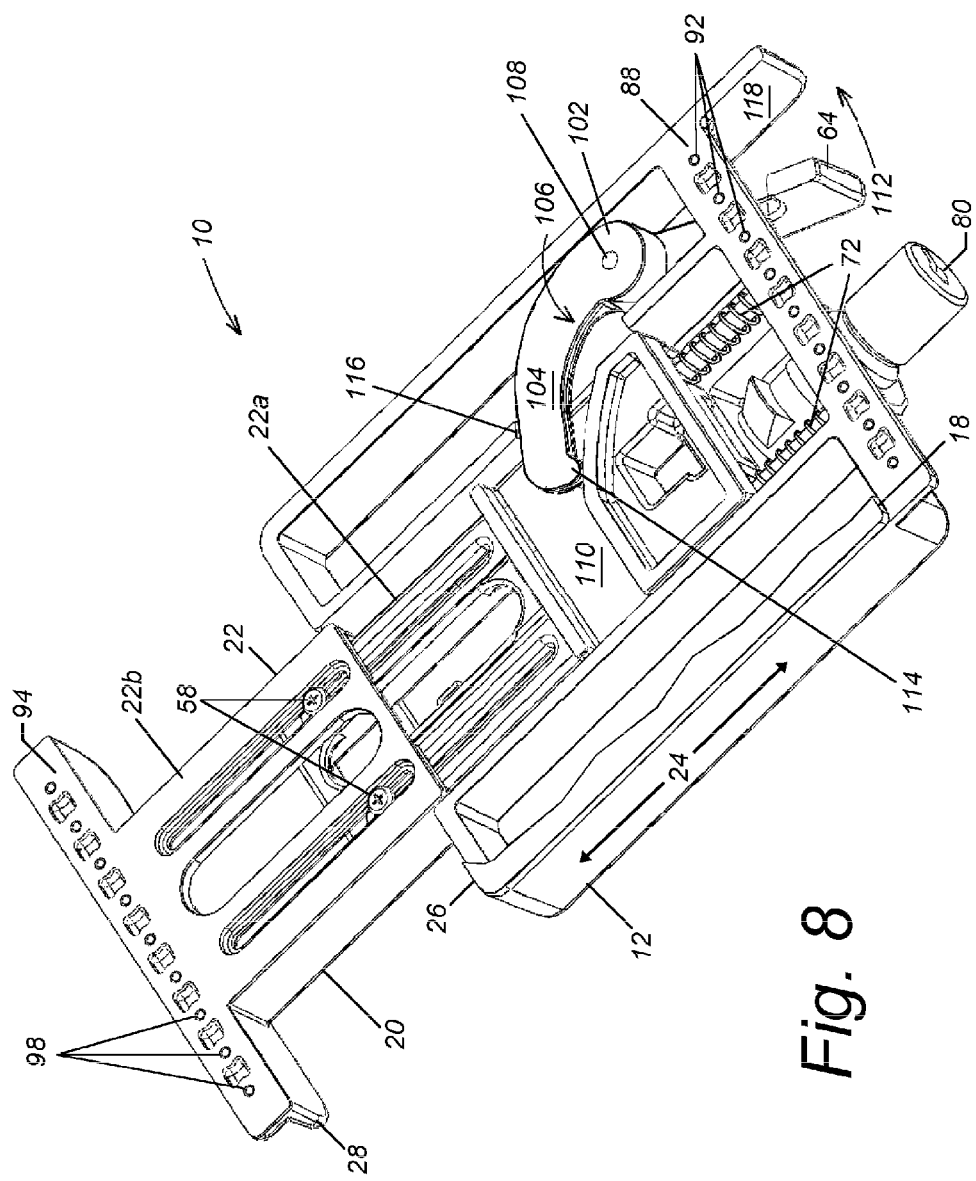
Figure 9:
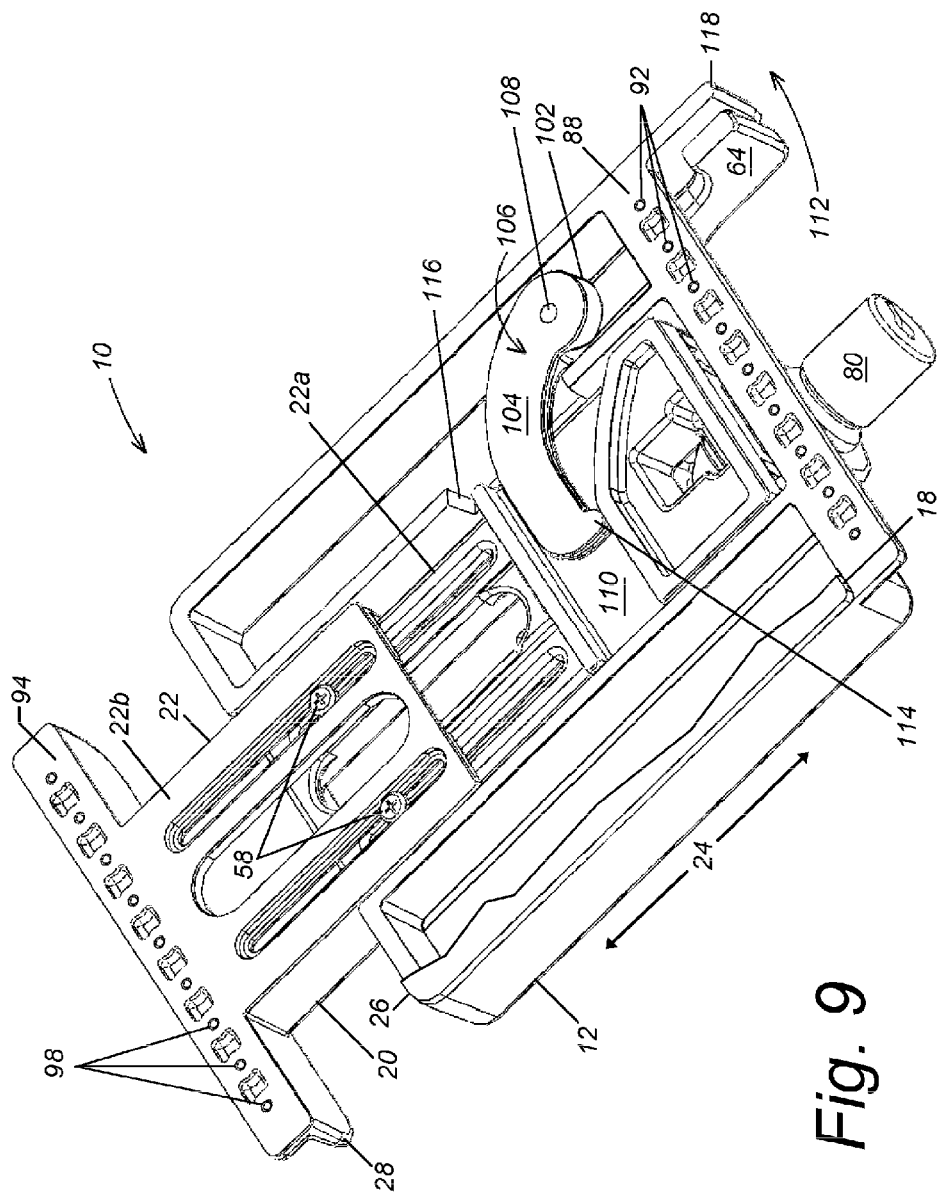

FIGS. 8 and 9 are detailed views of the interior of core drive module 10 of novel modular electronics platform apparatus 1.

Frame member 12 is illustrated having an attachment face 88 extended adjacent to first edge 18 of device mounting surface 14 and oriented substantially parallel thereto and transverse of direction 24 of clamp member 20. Each interchangeable jaw member 16 and 16' is formed with an attachable face 90 (FIG. 2) matable with first attachment face 88 of frame member 12. Attachable face 90 of each interchangeable stationary jaw member 16 and 16' is formed with means, such as a plurality of fastener apertures 92, structured to receive attachment mechanism 52 for coupling each interchangeable stationary jaw member 16 and 16' to attachment face 88 of frame member 12.

End cap 28 of clamp sled 22 is illustrated having an attachment face 94 which is positioned adjacent to second edge 26 of device mounting surface 14 when clamp member 20 is configured in the contracted relationship (FIG. 9) relative to frame member 12. Attachment face 94 is oriented substantially transverse of second edge 26 of device mounting surface 14 and direction 24 of clamp member 20. Each interchangeable movable jaw member 30 and 30' is formed with an attachable face 96 (FIG. 2) matable with attachment face 94 of clamp end cap 28. Attachable face 96 of each interchangeable movable jaw member 30 and 30' is formed with means, such as a plurality of fastener apertures 98, structured to receive attachment mechanism 54 for coupling each interchangeable movable jaw member 30 and 30' to attachment face 94 of clamp end cap 28.

In FIG. 8 clamp member 20 is configured in the expanded relationship relative to frame member 12, with sled portion 22 being extended along direction 24 along track 68 within frame member 12 by expansion of two biasing members 72. Base portion 22a of sled 22 is thus directed outwardly of mouth opening 70 in frame member 12 adjacent to second edge 26 of mounting surface 14.

Here, contractor drive 64 is part of a contractor mechanism 102 structured for contracting clamp member 20 relative to frame member 12. Contractor mechanism 102 also includes a substantially rigid contractor arm 104 fixed to contractor drive 64. Contractor drive 64 and contractor arm 104 are together pivotable (arrow 106) about a pivot pin 108. Contractor arm 104 cooperates with a contractor channel 110 formed in base portion 22a of sled 22 substantially transverse of direction 24 for contracting clamp member 20 relative to frame member 12. When contractor drive 64 is moved in a contracting direction (arrow 112), contractor arm 104 pivots about pivot pin 108, and a tip 114 of contractor arm 104 is rotated toward first edge 18 of mounting surface 14. Tip 114 of contractor arm 104 slides along contractor channel 110 of sled base portion 22a, always approaching first edge 18 of mounting surface 14. Accordingly, base portion 22a of sled 22 is drawn along track 68 of frame member 12 toward first edge 18 of mounting surface 14, and biasing members 72 are compressed between sled portion 22 of clamp member 20 and frame member 12.

Outward expansion of clamp member 20 relative to frame member 12 is optionally arrested at a desired degree of expansion. For example, contractor mechanism 102 also operates to arrest outward expansion of clamp member 20 by limiting expansive pivoting of contractor arm 104. Here, expansive pivoting of contractor arm 104 is limited such that contractor arm tip 114 remains engaged with contractor channel 110 of sled base portion 22a, whereby sled base portion 22a is restricted from further expansion outwardly of frame member 12. Here, expansive pivoting of contractor arm 104 is limited by contact with a stop portion 116 of frame member 12 that arrests expansive pivot motion of contractor mechanism 102.

FIG. 9 shows base portion 22a of sled 22 drawn along track 68 of frame member 12 toward first edge 18 of mounting surface 14 by pivoting of contractor mechanism 102 until catch 80 engages latching portion 78 of sled 22. Over pivoting of contractor mechanism 102 may be arrested. For example, contact between contractor drive 64 and a stop portion 118 of frame member 12 optionally arrests contractive pivot motion of contractor mechanism 102.

While preferred and additional alternative embodiments of invention have been illustrated and described, it will be appreciated that various changes can be made therein without departing from spirit and scope of invention. Therefore, it will be appreciated that various changes can be made therein without departing from spirit and scope of invention. Accordingly, inventor makes following claims.

What is claimed is:

1. A modular mounting apparatus, comprising:
   a drive module, comprising
      a base frame member comprising a device mounting surface wherein the device mounting surface is a tray and an attachment face adjacent to a first edge of the device mounting surface, and the base frame member further comprising mounting structure,
      a clamp member movably interconnected to the base frame member for motion along a direction of travel relative to a second edge of the device mounting surface opposite from the first edge thereof, the clamp member further comprising an attachment face distal from the base frame member and oriented substantially transverse of the direction of travel,
      a resilient biasing member coupled for urging the clamp member relative to the frame member, and
      a contractor arm that is operable for contracting the clamp member relative to the frame member, and
      wherein the attachment face of the base frame member is oriented substantially transverse of the direction of travel;
   means for detachably attaching a stationary jaw member to the attachment face of the frame member, and means for detachably attaching a movable jaw member to the attachment face of the clamp member; and
   either a plurality of different ones of the stationary jaw members each being interchangeably matable with the attachment face of the frame member, or a plurality of different ones of the movable jaw members each being interchangeably matable with the attachment face of the clamp member.

2. The apparatus of claim 1, wherein each of the plurality of the different ones of the interchangeable stationary jaw members comprises a different configuration.

3. The apparatus of claim 1, wherein each of the plurality of the different ones of the interchangeable movable jaw members comprises a different configuration.

4. The apparatus of claim 1, wherein the resilient biasing member is further coupled for urging the clamp member away from the frame member.

5. The apparatus of claim 4, wherein the resilient biasing member is positioned between an actuator portion of the frame member and a reaction portion of the clamp member.

6. The apparatus of claim 1, wherein the clamp member is further slidably interconnected to the frame member.

7. The apparatus of claim 1, wherein the contractor arm further comprises a pivotable contractor arm.

8. The apparatus of claim 7, further comprising a contractor channel formed in the clamp member substantially transverse of the direction of travel, and wherein the pivotable contractor arm cooperates with the contractor channel for contracting the clamp member relative to relative to the base frame member.

9. The apparatus of claim 8, wherein the contractor arm further cooperates with the clamp member for contracting a sled portion thereof toward the second edge of the device mounting surface.

10. The apparatus of claim 9, further comprising a contractor drive coupled for operating the contractor arm.

11. A modular mounting apparatus, comprising:
    a drive module, comprising
       a base frame member comprising a device mounting surface between spaced apart first and second edges, wherein the device mounting surface is a tray, and an attachment face extended from the first edge of the device mounting surface and oriented substantially parallel thereto, the base frame member further comprising mounting structure for the base frame member being mounted thereon,
       a clamp member slidably interconnected to the base frame member for motion relative to the second edge of the device mounting surface along a substantially linear direction of travel oriented substantially transverse thereof, the clamp member further comprising an attachment face spaced outwardly of the frame member from the second edge of the device mounting surface and substantially transverse of the direction of travel,
       a contractor mechanism coupled for slidably contracting the clamp member relative to the frame member, the contractor mechanism comprising: a contractor channel formed in the clamp member substantially transverse of the direction of travel, and a contractor arm that cooperates with the contractor channel for contracting the clamp member relative to the base frame member, and
       a resilient biasing member coupled between the clamp member and the frame member for urging the clamp member substantially along the direction of travel substantially away from the second edge of the device mounting surface of the base frame member;
    wherein the attachment face of the base frame member is oriented substantially transverse of the direction of travel;
    a plurality of different configurations of interchangeable stationary jaw members each comprising a cup portion extended there along and an attachable face matable with the attachment face of the base frame member;
    a plurality of different configurations of interchangeable movable jaw members each comprising a second cup portion extended there along and an attachable face matable with the attachment face of the clamp member; and
    means for detachably attaching different ones of the plurality of different configurations of interchangeable stationary jaw members to the attachment face of the base frame member, and means for detachably attaching different ones of the plurality of different configurations of interchangeable movable jaw members to the attachment face of the clamp member.

12. The apparatus of claim 11, wherein the contractor arm is a pivotable contractor arm.

13. The apparatus of claim 11, wherein the contractor arm is further coupled for contracting a sled portion of the clamp member along a track of the base frame member oriented substantially along the direction of travel.

14. The apparatus of claim 13, wherein the sled portion of the clamp member further comprises a channel formed therein; and
    further comprising a contractor drive coupled for operating the contractor arm.

15. A modular mounting apparatus, comprising:
    a drive module, comprising:
       a base frame member formed with a device mounting surface between opposing first and second edges spaced apart along a substantially linear direction of travel, wherein the device mounting surface is a tray, the base frame member further comprising an attachment face adjacent to the first edge of the device mounting surface and oriented substantially transverse of the direction of travel, and the base frame member being structured for the base frame member being mounted thereon, a track formed substantially along the direction of travel adjacent to the device mounting surface of the base frame member, a clamp member having an elongated sled portion and an end cap adjacent to a first end thereof and comprising an attachment face extended there along the sled portion being slidably interconnected to a guide of the frame member for motion substantially along the direction of travel, a pivotable contractor arm coupled between the first sled portion of the clamp member and the base frame member for contracting the clamp member relative to the frame member along a track of the base frame member oriented substantially along the direction of travel, and a resilient biasing member coupled between the frame and clamp members for urging the sled portion of the clamp member along the guide relative to the direction of travel, the biasing member being configured for resiliently urging the jaw member of the clamp member away from the second edge of the frame member;

a plurality of different interchangeable stationary jaw members each comprising an attachable face and a plurality of different configurations each including a cup portion projected from the attachable face, the attachable face being matable with the attachment face of the base frame member and being attachable thereto adjacent to the first edge of the base frame member and oriented substantially transverse of the direction of travel;

means for detachably attaching different ones of the plurality of different interchangeable stationary jaw members to the attachment face of the base frame member;

a plurality of different interchangeable movable jaw members each comprising an attachable face and a plurality of different configurations each including a cup portion projected from the attachable face, the attachable face being matable with the attachment face of the end cap of the clamp member and being attachable thereto adjacent to the first end thereof oriented substantially transverse of the direction of travel and in an opposing relationship to one of the stationary jaw members across the device mounting surface of the frame; and means for detachably attaching different ones of the plurality of different interchangeable movable jaw members to the attachment face of the end cap of the clamp member.

16. The apparatus of claim 15, wherein the clamp further comprises a telescoping clamp, wherein a first sled portion slidably interconnected to the guide of the base frame member for motion substantially along the direction of travel, and a second sled portion slidably interconnected to the first sled portion and further comprising the end cap thereof.

17. The apparatus of claim 16, wherein the contractor arm is further coupled for contracting the first sled portion thereof toward the second edge of the device mounting surface along the direction of travel, and further comprising a contractor drive coupled for operating the contractor arm.

18. The apparatus of claim 17, wherein the sled portion of the clamp member further comprises a channel formed therein substantially crosswise of the direction of travel; and wherein the contractor arm is further coupled for cooperating with the channel for contracting the first sled portion of the clamp member toward the second edge of the device mounting surface along the direction of travel.

19. The apparatus of claim 18, wherein the second sled portion of the clamp member is further positionally fixable in a plurality of different positions relative to the first sled portion along the direction of travel.

* * * * *